UNITED STATES PATENT OFFICE.

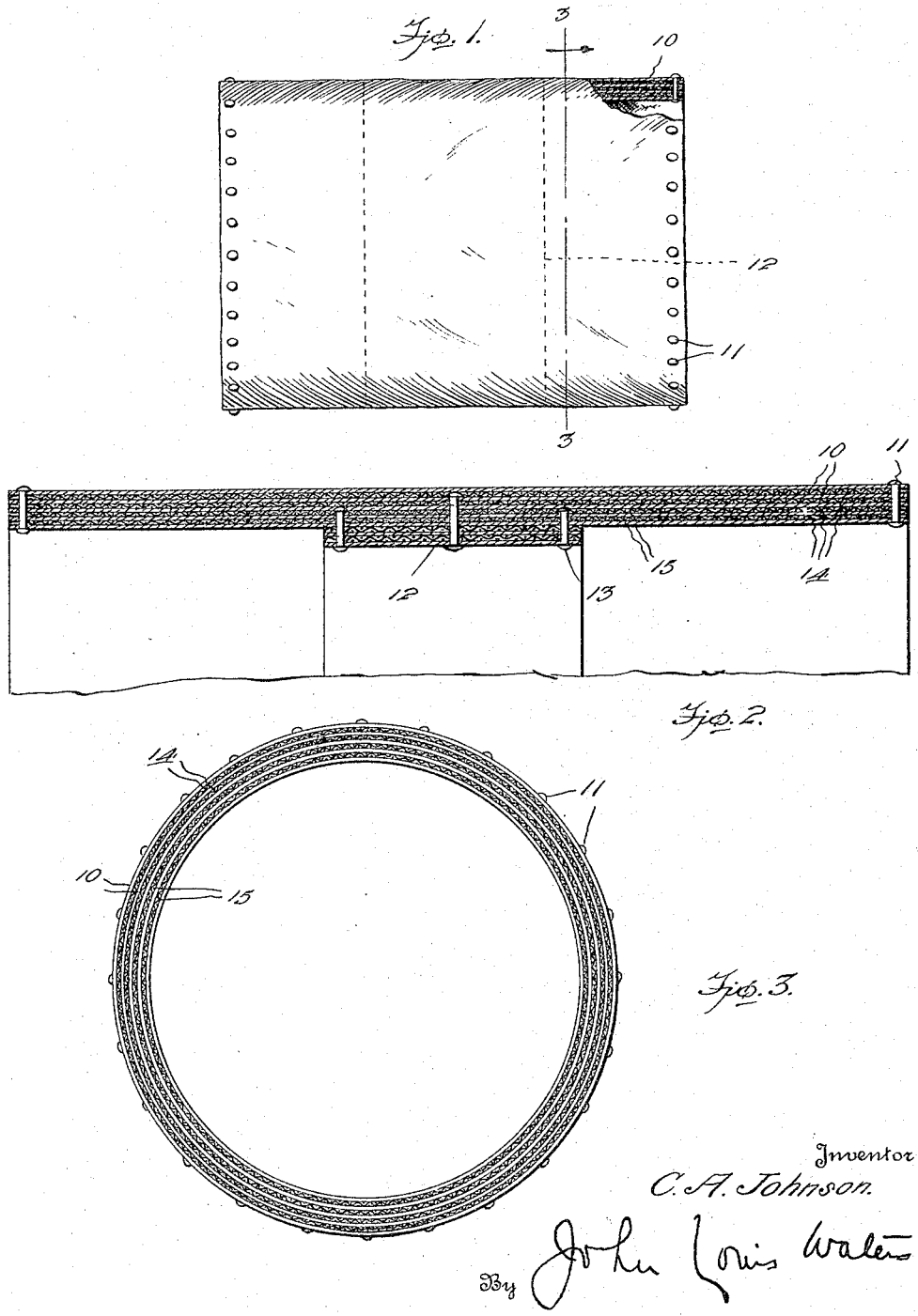

CHARLES A. JOHNSON, OF GALVESTON, TEXAS.

FLEXIBLE CONDUIT.

1,229,087.                    Specification of Letters Patent.       Patented June 5, 1917.

Application filed September 9, 1916. Serial No. 119,293.

*To all whom it may concern:*

Be it known that I, CHARLES A. JOHNSON, citizen of the United States, residing at Galveston, in the county of Galveston and State of Texas, have invented certain useful Improvements in Flexible Conduits, of which the following is a specification, reference being had therein to the accompanying drawing.

This invention relates to dredge sleeves or couplings although it is susceptible for use in other capacities.

Primarily however, the invention aims to construct a sleeve or conduit of the above mentioned character, possessing maximum strength consistent with the desired degree of resiliency and flexibility, and further constructed to materially prolong the life of such couplings.

The nature and advantages of the invention will be better understood when the following description is read in connection with the accompanying drawing, the invention residing in the construction, combination and arrangement of parts as claimed.

In the drawing forming part of this specification like numerals of reference indicate similar parts in the several views and wherein:—

Figure 1 is a side elevation partly in section.

Fig. 2 is a longitudinal sectional view therethrough.

Fig. 3 is a transverse sectional view taken on line 3—3 of Fig. 1.

A conduit or coupling constructed in accordance with my invention is preferably made up of a plurality of canvas waterproof sections 10, each of which is preferably four-ply and provided with a steel wire mesh reinforcement. The sections of course are arranged one about the other in cylindrical form and riveted or otherwise secured together as at 11 about the opposite ends of the conduit. Arranged centrally within the conduit is a steel wire cloth liner 12 of any suitable ply, which liner is riveted within the conduit as at 13. This liner is employed for a number of very important purposes, it serving to preserve the configuration of the conduit, in other words stiffening the same, and also preventing the iron bars, rocks or other sharp instruments passing through the conduit from puncturing the latter, thus materially prolonging the life of couplings of this character.

With a view of affording the conduit maximum strength, consistent with the maximum resiliency and flexibility, the gage of the steel wire reinforcement of certain of the sections vary, and in addition to which fact terminate short of the ends of their respective sections different distances. The sections thus constructed are placed in order, one about the other in a manner whereby the conduit from end to end is practically rigid, but possesses maximum resiliency and flexibility transversely from the opposite sides of the steel liner 12 throughout the length of the conduit, consistent with the endwise rigidity of the latter. For example, the conduit shown in this particular instance has its outermost section reinforced by a steel wire mesh 14, say of 9" wire while the next innermost section 10 is reinforced by steel wire mesh 15, say of 22" wire, but the wire mesh reinforcement 14 of the 9" wire is approximately one-half the length of the wire mesh reinforcement 15 of the 22" wire. The next innermost section of the conduit is reinforced by a steel wire mesh, say of 15" wire which also is approximately one-half the length of the reinforcement 15 of the 22" wire. The wire mesh reinforcement of the respective sections in addition to varying in gage, terminate short of the ends of the conduit different distances to provide the desired strength, resiliency and flexibility required in a coupling of this character. It is to be understood however that the figures herein enumerated with reference to the gage of the wire can be varied, and the different sections alternately disposed in the most advantageous manner for the purpose intended, and as many sections employed in the production of a unit as found necessary.

It is believed that from the foregoing description the nature and advantages of the invention will be readily apparent, and it is desired to have it understood that what is herein shown and described is merely illustrative of one embodiment of the invention to which I do not limit myself and that such changes may be resorted to when desired as fall within the scope of what is claimed.

What is claimed is:—

1. A conduit made up of a plurality of flexible water-proof sections riveted together at the ends of the conduit, each section being reinforced, and a centrally disposed wire cloth liner within the conduit and riveted to said sections.

2. A conduit made up of a plurality of flexible water-proof sections riveted together at the ends of the conduit, each section having a steel wire mesh reinforcement, and the gage of the reinforcement of certain sections varying from the remaining sections.

3. A conduit made up of a plurality of flexible water-proof sections riveted together at the ends of the conduit, each section having a steel wire mesh reinforcement, the gage of the reinforcement of certain sections varying from the remaining sections, and a centrally disposed steel wire liner within the conduit and riveted to said sections.

4. A conduit made up of a plurality of flexible water-proof sections, each section having a wire mesh reinforcement, and the reinforcement of certain sections terminating different distances short of the ends of the conduit.

5. A conduit made up of a plurality of flexible water-proof sections, each section having a wire mesh reinforcement, the gage of the reinforcement of certain sections varying from that of the remaining sections, and the reinforcement of certain sections terminating different distances short of the ends of the conduit.

6. A conduit made up of a plurality of flexible water-proof sections, each section having a wire mesh reinforcement, the reinforcement of certain sections terminating different distances short of the ends of the conduit, and a centrally disposed steel wire liner within the conduit and riveted to said sections.

7. A conduit made up of a plurality of flexible water-proof sections, each section having a wire mesh reinforcement, the gage of the reinforcement of certain sections varying from that of the remaining sections, the reinforcement of certain sections terminating different distances short of the ends of the conduit, and a centrally disposed wire cloth liner within the conduit and riveted to said sections.

In testimony whereof I affix my signature.

CHARLES A. JOHNSON.